(12) United States Patent
Kubota

(10) Patent No.: US 8,189,060 B2
(45) Date of Patent: May 29, 2012

(54) IMAGE SENSING APPARATUS AND METHOD FOR CONTROLLING THE SAME

(75) Inventor: Akira Kubota, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 328 days.

(21) Appl. No.: 12/692,404

(22) Filed: Jan. 22, 2010

(65) Prior Publication Data

US 2010/0194925 A1 Aug. 5, 2010

(30) Foreign Application Priority Data

Feb. 3, 2009 (JP) ................................. 2009-022962

(51) Int. Cl.
*H04N 5/235* (2006.01)

(52) U.S. Cl. .................. 348/221.1; 348/229.1; 348/362; 348/371

(58) Field of Classification Search ............... 348/221.1, 348/222.1, 119.1, 362–366, 371; 396/155, 396/157, 161, 180, 237, 238

See application file for complete search history.

(56) References Cited

U.S. PATENT DOCUMENTS

| 2006/0001748 | A1* | 1/2006 | Kamon et al. ................ 348/234 |
| 2006/0044459 | A1* | 3/2006 | Kato ............................. 348/362 |
| 2008/0007634 | A1* | 1/2008 | Nonaka et al. ................ 348/234 |
| 2008/0225136 | A1* | 9/2008 | Yamada ..................... 348/229.1 |
| 2008/0284901 | A1 | 11/2008 | Misawa |

FOREIGN PATENT DOCUMENTS

JP 2008-287091 11/2008

* cited by examiner

*Primary Examiner* — Yogesh Aggarwal

(74) *Attorney, Agent, or Firm* — Cowan, Liebowitz & Latman, P.C.

(57) ABSTRACT

Receiving an instruction from a user to start sensing a still image, an image sensing apparatus performs scene determination based on an evaluation value of scene determination from an image sensed immediately after the luminance of the image converges to a predetermined range of a target luminance. The image sensing apparatus can accurately determine a scene of the image even the image sensor with a narrow dynamic range.

6 Claims, 12 Drawing Sheets

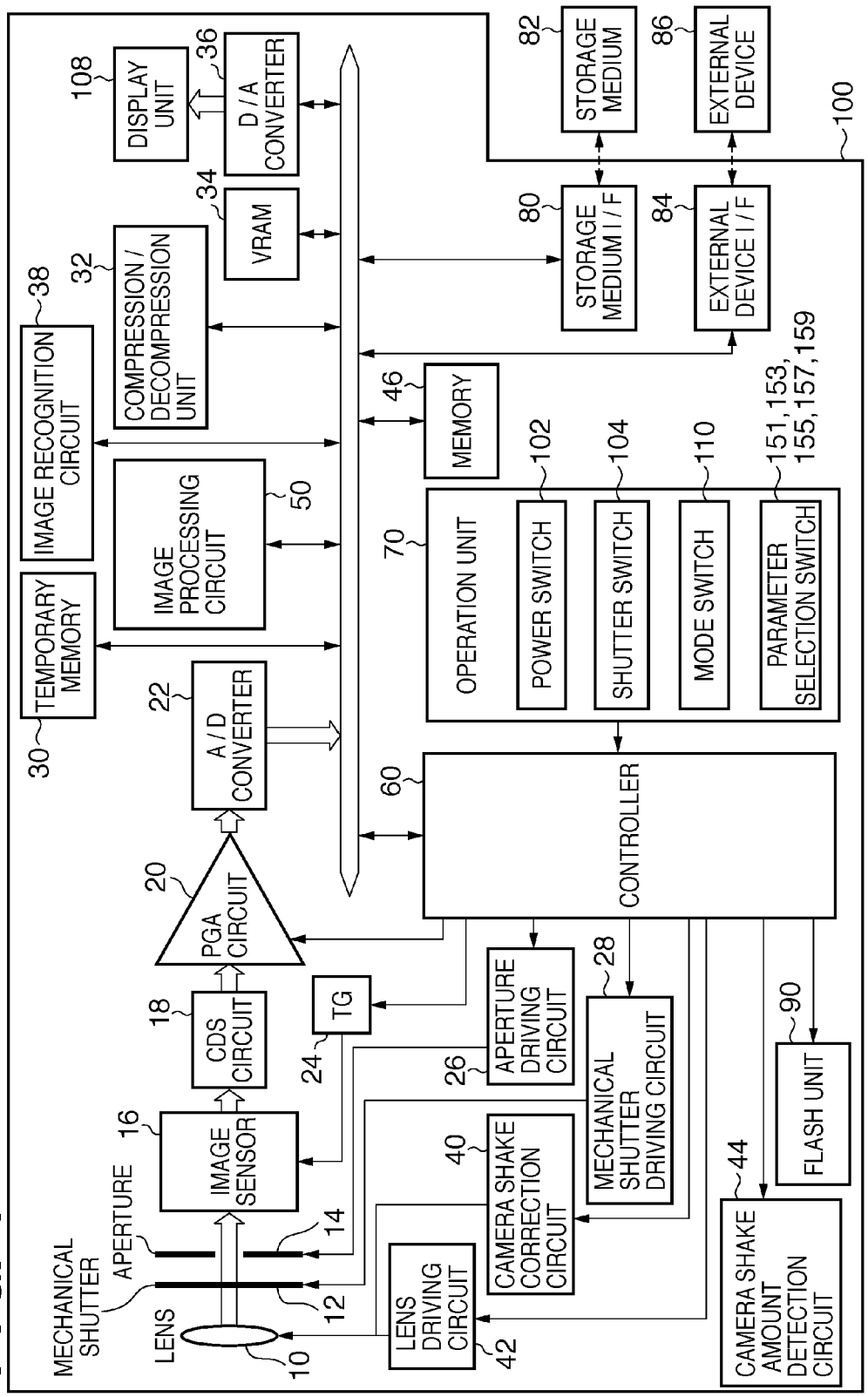

FRONT SURFACE

REAR SURFACE

FIG. 4
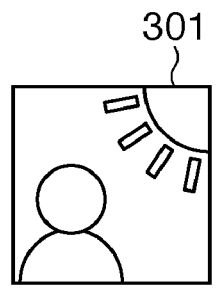 301
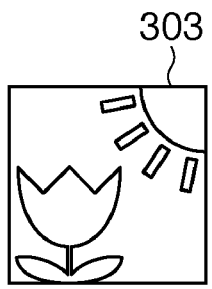 303
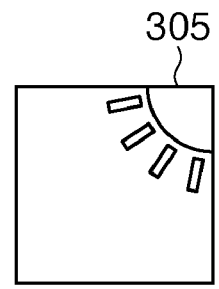 305
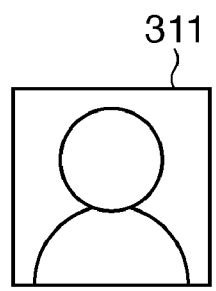 311
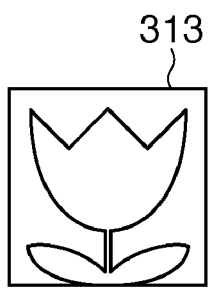 313
 315
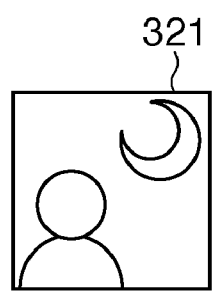 321
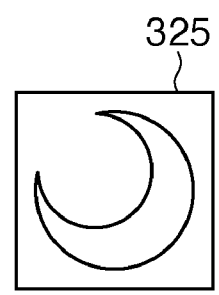 325
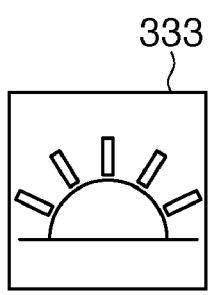 333

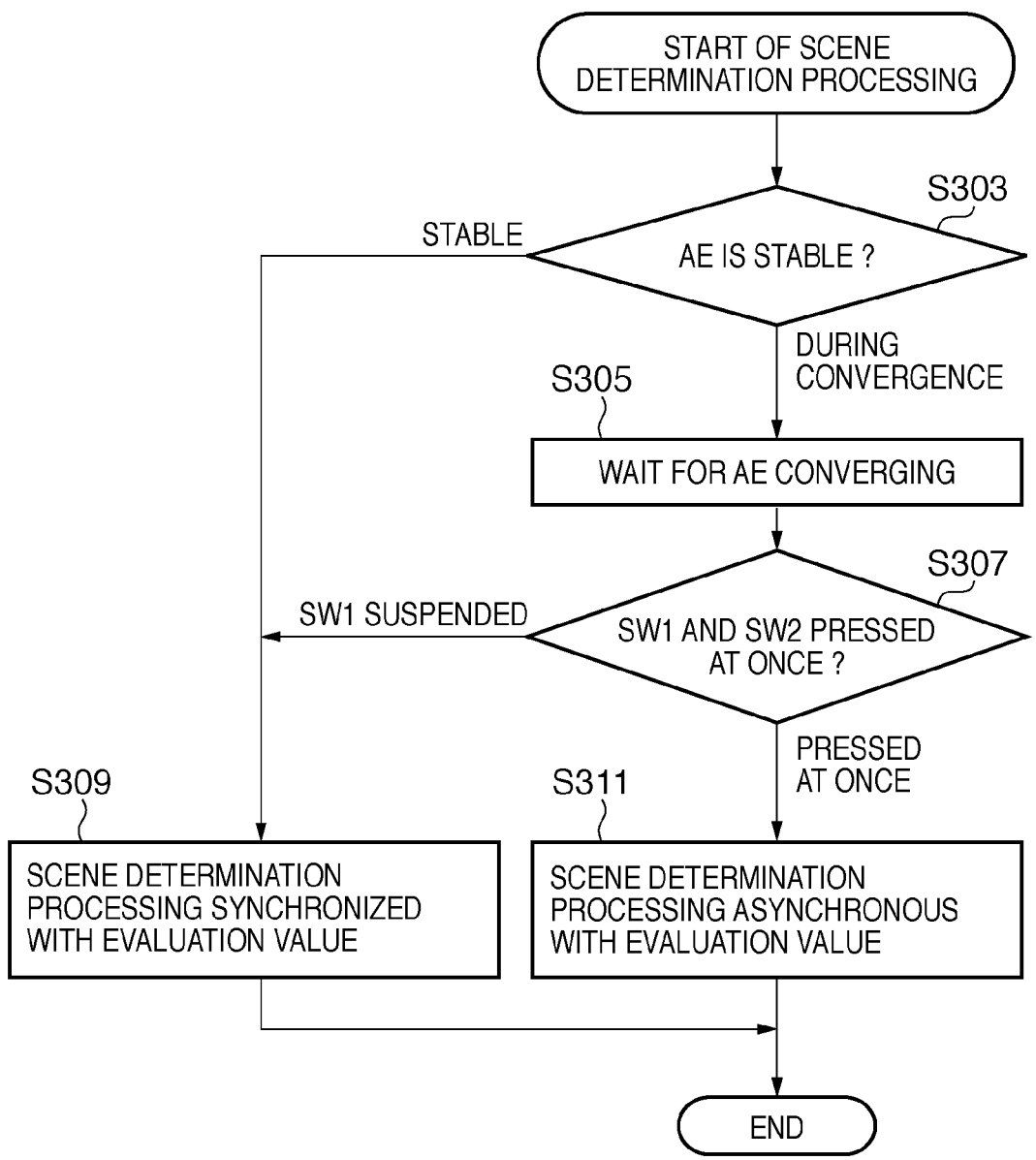

IMAGE SENSING APPARATUS AND METHOD FOR CONTROLLING THE SAME

BACKGROUND OF THE INVENTION

1. Field of the Invention

The present invention relates to an image sensing apparatus and a method for controlling the same.

2. Description of the Related Art

Some conventional image sensing apparatuses such as a digital still camera determine various conditions such as the brightness, color, distance, and motion of a sequentially sensed subject, and calculate the evaluation value of scene determination representing the condition of the subject. An image sensing apparatus of this type senses an image in accordance with a scene specified by the calculated evaluation value of scene determination and a result of a face detection. For example, Japanese Patent Laid-Open No. 2008-287091 discloses a technique for sensing an image corresponding to a scene. According to this technique, a backlight scene is detected based on the evaluation value of scene determination representing the brightness difference between an area estimated to contain a main subject and the remaining area. And the exposure control is done to cancel the backlight.

However, a narrow dynamic range of an image sensor arises as a problem when determining various conditions such as the brightness, color, distance, and motion of a subject by the image sensor such as a CCD image sensor or CMOS image sensor. The image sensor used to sense still images and moving images doesn't have enough dynamic range and is not suitable for photometry of a scene which greatly changes the brightness difference. If the exposure is improper, highlight detail loss at a bright area and shadow detail loss at a dark area stand out. Even if it is tried to detect various conditions such as the brightness, color, distance, and motion of a sequentially sensed subject, appropriate detection may fail. If a scene is determined in this situation, image sensing based on the determination result sometimes leads to an unnatural image.

SUMMARY OF THE INVENTION

The present invention has been made to overcome the conventional drawbacks. The present invention provides an image sensing apparatus capable of appropriate scene determination even if the dynamic range of an image sensor is narrow, and a method for controlling the same.

The present invention in its first aspect provides an image sensing apparatus comprising: an image sensing unit adapted to sense images of a subject in time series; a calculation unit adapted to calculate an evaluation value of scene determination used for determination of a condition of the subject, for one of the images sensed by the image sensing unit; a scene determination unit adapted to determine the condition of the subject based on the evaluation value of scene determination calculated by the calculation unit; an operation receiving unit adapted to receive an instruction from a user to start a preparation of sensing a still image and an instruction from the user to start sensing a still image; and a control unit adapted to control the scene determination unit and, if the operation receiving unit receives the instruction to start sensing a still image, further control the image sensing unit to perform sensing one still image based on the condition of the subject determined by the scene determination unit, wherein if the operation receiving unit receives the instruction to start the preparation of sensing a still image, the control unit further controls the scene determination unit to determine the condition of the subject based on the evaluation value of scene determination calculated from an image sensed by the image sensing unit immediately after the luminance of the images converges to a predetermined range of a target luminance.

Further features of the present invention will become apparent from the following description of exemplary embodiments (with reference to the attached drawings).

BRIEF DESCRIPTION OF THE DRAWINGS

FIG. 1 is a block diagram showing the whole arrangement of an image sensing apparatus;

FIG. 4 is a view exemplifying a scene icon which abstracts each scene;

FIG. 12 is a flowchart showing scene determination processing.

DESCRIPTION OF THE EMBODIMENTS

Figure 2A:
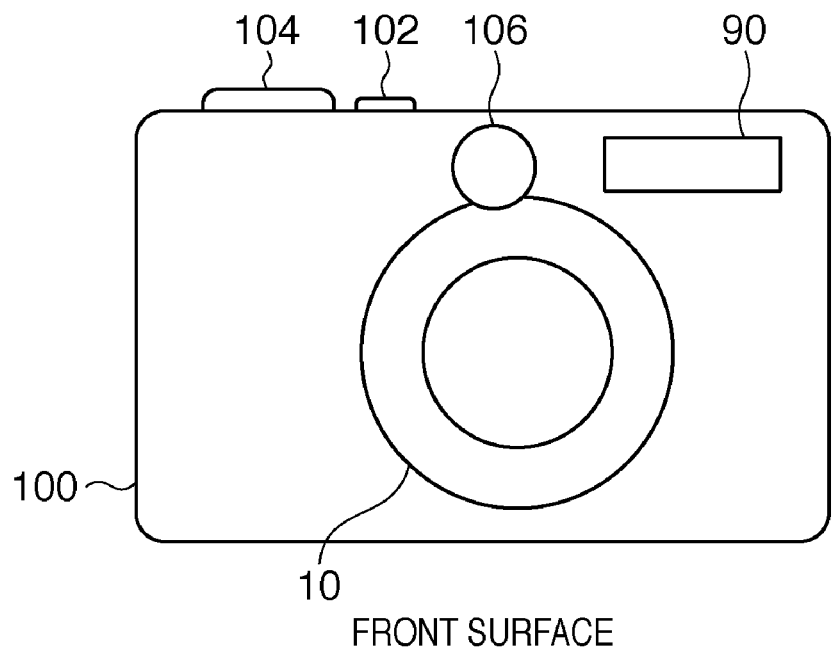
FIG. 2A is a view showing the outer appearance of the front surface of the image sensing apparatus.

A preferred embodiment of the present invention will be described below with reference to the accompanying drawings, but the present invention is not limited to the following embodiment. The embodiment of the present invention is the best mode of the invention and does not limit the scope of the invention.

FIG. 1 is a block diagram showing the whole arrangement of an image sensing apparatus 100 according to the embodiment. As shown in FIG. 1, in the image sensing apparatus 100, a lens 10 converges external light on an image sensor 16. In FIG. 1, the lens 10 includes one lens, but the image sensing apparatus 100 can adopt a lens unit made up of a plurality of lenses.

The lens 10 can adjust the focus and the angle of view by moving the lens position back and forth along the optical axis by a lens driving circuit 42. The lens 10 can execute optical camera shake correction by driving the lens by a camera shake correction circuit 40, based on the camera shake amount of the image sensing apparatus 100 that is measured by a camera shake amount detection circuit 44, and changing the optical axis in a direction in which a camera shake is canceled. The camera shake amount detection circuit 44 includes, for example, a gyro sensor for measuring the camera shake amount of the image sensing apparatus 100. In FIG. 1, camera shake correction is implemented by driving the lens by the lens driving circuit 42. Instead, camera shake correction may be achieved by similarly driving the image sensor 16.

An aperture 14 adjusts the quantity of light having passed through the lens 10. In the image sensing apparatus 100, a controller 60 can control the aperture 14 by transmitting aperture control information to an aperture driving circuit 26.

The aperture 14 is an iris aperture formed from a plurality of blades or a circular aperture obtained by punching holes with various diameters in advance in a plate. With the aperture 14 and aperture driving circuit 26, the controller 60 controls to stop down the aperture and decrease the light quantity when the luminance of subject's area is high, or open the aperture to receive a larger amount of light when the luminance of subject's area is low.

In the image sensing apparatus 100, the controller 60 controls a mechanical shutter 12 by transmitting mechanical shutter control information to a mechanical shutter driving circuit 28. The controller 60 determines the exposure time when sensing a still image, and gives an instruction to the mechanical shutter driving circuit 28 based on it.

The image sensor 16 receives light having passed through the lens 10, mechanical shutter 12, and aperture 14. The controller 60 controls the image sensor 16 by transmitting an image sensor control signal to a TG (Timing Generator) 24.

The TG 24 drives the image sensor 16 based on an image sensor control signal received from the controller 60. The image sensor 16 is a CCD (Charge Coupled Device) image sensor or CMOS (Complementary Metal Oxide Semiconductor) image sensor. The image sensor 16 photoelectrically converts a subject image received upon exposure. Based on a driving signal from the TG 24, the image sensor 16 performs exposure and reads out the sensed image data photoelectrically converted upon exposure. The exposure and the readout of the photoelectrically converted sensed image data may be executed periodically based on a driving signal from the TG 24.

The sensed image data photoelectrically converted by the image sensor 16 may be read out from only a specific line or specific area. This can be achieved by changing the readout method in accordance with a readout driving signal output from the TG 24. The controller 60 determines an optimum readout method for the situation, and gives an instruction to the TG 24 based on it. For example, when sensing a still image, a method of reading out all data from the image sensor 16 is determined as an optimum readout method because high-resolution sensed image data is required. When using an electronic viewfinder or sensing a moving image, for example, a method of reading out data from only specific lines of the image sensor 16 by decimation is determined as an optimum readout method because a high frame rate of 30 fps, 60 fps, or the like is necessary.

The controller 60 can control the exposure time of the image sensor 16 based on a driving signal from the TG 24. For this purpose, the controller 60 controls the TG 24 to output a driving signal to the image sensor 16 so that the image sensor 16 outputs charges generated by photoelectric conversion at an arbitrary timing.

The sensed image data read out from the image sensor 16 is output to a CDS (Correlated Double Sampler) circuit 18. The main function of the CDS circuit 18 is to remove a noise component from the sensed image data by correlated double sampling. A PGA (Programmable Gain Amplifier) circuit 20 decreases/increases the signal level of the resultant sensed image data. The controller 60 transmits the amplification level to the PGA circuit 20 to control the decrease/increase amount by the PGA circuit 20.

In general, the controller 60 makes exposure of the image sensor 16 correct by setting the aperture 14 to an aperture value at which the exposure on the image sensor 16 becomes appropriate, and by properly setting the exposure time of the mechanical shutter 12. The PGA circuit 20 can provide a function of pseudo-switching exposure by attenuating/amplifying the sensed image data. That is, the PGA circuit 20 provides a function of switching the sensitivity, which is one of exposure conditions, like the aperture and shutter speed.

An A/D (Analog/Digital) converter 22 converts the sensed image data attenuated/amplified by the PGA circuit 20 from an analog signal into a digital signal. In FIG. 1, the CDS circuit, PGA circuit, and A/D converter are expressed as separate blocks, but one IC (Integrated Circuit) package may provide these functions.

The sensed image data converted into a digital signal by the A/D converter 22 is input to an image processing circuit 50. The image processing circuit 50 includes a plurality of blocks for performing image processes, and executes various kinds of image processes. The image sensor 16 extracts a specific color component from each pixel via a color filter (not shown). The sensed image data output from the A/D converter 22 has a data format corresponding to the layouts of the pixels and color filters of the image sensor 16. This data format is not suitable for use in auto exposure (AE) control for performing exposure control by evaluating only a luminance component from the A/D converter 22. Thus, the image processing circuit 50 has a function of removing color information from the sensed image data and extracting only luminance information. The image processing circuit 50 also has a function of extracting color information in contrast. The light source of a subject can be specified and used for white balance (AWB) processing of properly adjusting color.

Further, the image processing circuit 50 has a function of extracting only the frequency component of sensed image data from the image sensor 16. The frequency component can be used for auto focus (AF) control. The image processing circuit 50 has a function of determining a area of the sensed image data read out from the image sensor 16 from which a frequency component is to be extracted, or determining how to divide the area.

In addition, the image processing circuit 50 has a function of increasing/decreasing the level of sensed image data converged into a digital signal by the A/D converter 22, and operating the color effect of an image and the like. The image processing circuit 50 adjusts the quality of a sensed image. As for the level of sensed image data, the image processing circuit 50 can execute various adjustment processes. For example, the level is increased/decreased by applying the same amplification factor to the entire image. The signal level is gamma-converted in accordance with the original signal level. The level is increased/decreased at an amplification factor corresponding to the frequency component of each area within the frame.

The sensed image data converted into a digital signal by the A/D converter 22 may be input to the image processing circuit 50 and at the same time, stored in a temporary memory 30. The sensed image data stored once in the temporary memory 30 can be read out again. The image processing circuit 50 can refer to the sensed image data, or readout the sensed image data can be input to the image processing circuit 50. The sensed image data processed by the image processing circuit 50 can be written back in the temporary memory 30, or arbitrary data from the image processing circuit 50 can be written in the temporary memory 30.

The sensed image data processed by the image processing circuit 50 is input to an image recognition circuit 38. The image recognition circuit 38 can recognize the brightness, focus state, and color of an input image (the sensed image data). In addition, the image recognition circuit 38 can recognize a human face and its expression, and when a character exits, the character information. The image recognition circuit 38 can receive a plurality of images. For example, the image recognition circuit 38 receives two images and compares the features of them to determine whether these two images are identical.

Image recognition can be done by the controller 60 in addition to the image recognition circuit 38. The controller 60 can execute pre-coded programs on a CPU (Central Processing Unit: not shown). By sequentially executing the programs, the controller 60 can read out the sensed image data stored in the temporary memory 30, analyze the readout the sensed image data, and recognize the situation in sensing the image.

When displaying the sensed image data on a display unit 108 such as an LCD (Liquid Crystal Display), the controller 60 rasterizes, in a VRAM (Video Random Access Memory) 34, the sensed image data processed by the image processing circuit 50. The sensed image data rasterized in the VRAM 34 is converted into analog data by a D/A converter 36 and displayed on the display unit 108. Electronic viewfinder display is provided by successively reading out the sensed image data from the image sensor 16 and sequentially displaying them on the display unit 108. The sensed image data may be rasterized in the VRAM 34 in correspondence with various display forms such that one sensed image is displayed largest on the display unit 108 or a plurality of sensed images are displayed as a multiwindow.

The display unit 108 may display not only an image but also arbitrary information singly or together with an image. More specifically, information displayed on the display unit 108 includes text information (for example, the state of the image sensing apparatus 100, a shutter speed selected by the user or determined by the image sensing apparatus 100, an aperture value, and sensitivity information), a graph such as a luminance distribution measured by the image processing circuit 50, a result of the face detection, and a result of the scene determination. The display unit 108 can arbitrarily select the display position and display color of information in accordance with a user operation instruction accepted via an operation unit 70. The image sensing apparatus 100 displays various kinds of information on the display unit 108 in accordance with a user operation instruction received via the operation unit 70.

The operation unit 70 includes a power switch 102, shutter switch 104, mode switch 110, and parameter selection switches 151, 153, 155, 157, and 159. The power switch 102 receives the power ON/OFF instruction from the user. The shutter switch 104 receives, from the user, the instruction to prepare for sensing an image, and to start sensing. The mode switch 110 receives mode switching instruction of an image sensing from the user. The parameter selection switches 151, 153, 155, 157, and 159 receive parameter selection instructions from the user. Details of these switches will be described later.

The display unit 108 can also display image data stored in a storage medium 82 connected to the image sensing apparatus 100 via a storage medium I/F 80. When image data has been compressed, it is decompressed by a compression/decompression unit 32 and the decompressed image data is rasterized in the VRAM 34.

The storage medium 82 is connectable to the image sensing apparatus 100 via the storage medium I/F 80. The storage medium 82 is a nonvolatile memory capable of reading out or storing data under the control of the controller 60. The storage medium 82 can store sensed image data mainly. Image sensing information including the aperture value, shutter speed, ISO sensitivity, and sensed time can be added to each image data. The added data may be stored in the storage medium 82 together with image data.

An external device I/F 84 is a communication interface for connecting an external device 86 such as a PC (Personal Computer). The image sensing apparatus 100 and external device 86 are connected to be able to communicate with each other via the external device I/F 84, and can exchange data under the control of the controller 60. For example, sensed image data is transferred via the external device I/F 84 in accordance with an instruction from the external device 86.

Figure 2B:
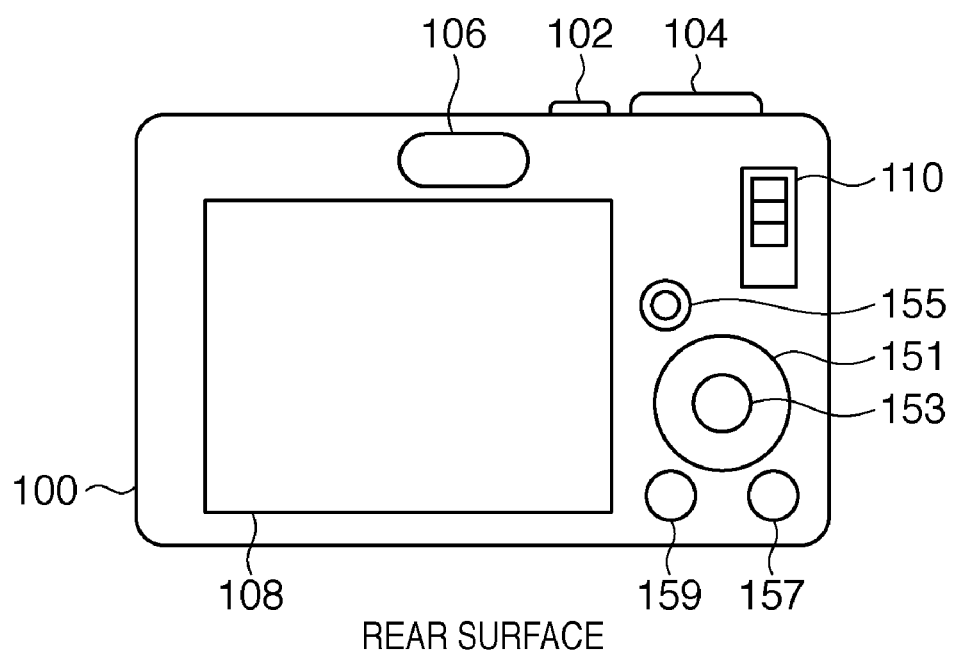
FIG. 2B is a view showing the outer appearance of the rear surface of the image sensing apparatus.

FIGS. 2A and 2B are views showing the appearance of the image sensing apparatus 100. FIG. 2A is a view showing the appearance of the front surface of the image sensing apparatus 100. FIG. 2B is a view showing the appearance of the rear surface of the image sensing apparatus 100.

As shown in FIG. 2A, the lens 10 is attached to the front surface of the image sensing apparatus 100, and the image sensing apparatus 100 can sense a subject image. On the same surface (front surface) equipped with the lens 10, a flash unit 90 is arranged, emission of which is controlled by the controller 60. When a main subject is dark, the image sensing apparatus 100 can obtain a light quantity enough for image sensing by causing the flash unit 90 to emit light. Even in a dark situation, the image sensing apparatus 100 can maintain a high shutter speed and obtain a preferable sensed image.

As shown in FIG. 2B, the display unit 108 is arranged on the rear surface of the image sensing apparatus 100. The display unit 108 is usable as a viewfinder for providing an electronic viewfinder display of successively displaying images sequentially sensed by the image sensor 16 so that the user can sense a subject image by referring to the successive images (live images). At this time, photometry area information and distance measurement area information in AE (Auto Exposure) and AF (Auto Focus) can be displayed by superimposing them on live images. As subject recognition information, the display unit 108 may display a frame by superimposing it on a human face in accordance with the result of recognizing the human face, or display an icon representing the result of recognizing the situation of a background scene such as a blue sky, evening sun, or backlight.

A conventional optical viewfinder 106 may also be attached to the rear surface of the image sensing apparatus 100.

The mode switch 110 is arranged on the rear surface of the image sensing apparatus 100. The mode switch 110 receives an instruction from the user to switch the operation mode of the image sensing apparatus 100, such as a still image sensing mode, moving image sensing mode, and playback mode.

The parameter selection switches 151, 153, 155, 157, and 159, such as an SET switch and cursor switch, are arranged on the rear surface of the image sensing apparatus 100. With the parameter selection switches 151, 153, 155, 157, and 159, the user can select image sensing conditions of sensing, including the distance measurement area and photometry mode, and select and set parameters including page feed in playing back a sensed image and general operation settings. The user may select the ON/OFF state of the electronic viewfinder display.

The display unit 108 displays an image and may function as a touch panel to receive, from the user, the same settings as those with the parameter selection switches 151, 153, 155, 157, and 159.

As shown in FIGS. 2A and 2B, the power switch 102 and shutter switch 104 are arranged at the top of the image sensing apparatus 100. The shutter switch 104 receives two stroke operations from the user, that is, halfway stroke (SW1 operation) and full stroke (SW2 operation) of the switch. The shutter switch 104 receives an instruction from the user by the SW1 operation to start preparation of sensing a still image, and an instruction by the SW2 operation to start sensing a still image. When the user presses the shutter switch 104 halfway, the image sensing apparatus 100 executes auto exposure adjustment and auto focus adjustment as image sensing preparations. When the user presses the shutter switch 104 fully, the image sensing apparatus 100 senses a still image and recognizes it.

In auto exposure adjustment, the controller 60 performs exposure control in accordance with, for example, a control sequence complying with an image sensing mode selected with the mode switch 110. The controller 60 controls to obtain a preferable exposure in the image sensing mode selected with the mode switch 110. The image sensing mode includes a general-purpose image sensing mode such as an auto mode. The image sensing mode may include a shutter speed priority mode which gives priority to a shutter speed set in advance by the user, and an aperture priority mode which gives priority to an aperture value set in advance by the user.

In these image sensing modes, a sensitivity set by the PGA circuit 20 can be preferably automatically selected and set, or the user can designate a sensitivity in advance. When the user designates a sensitivity in advance, the S/N ratio of an obtained image signal decreases for higher sensitivity. A user who wants to give priority to the image quality is expected to select low sensitivity.

Figure 3:
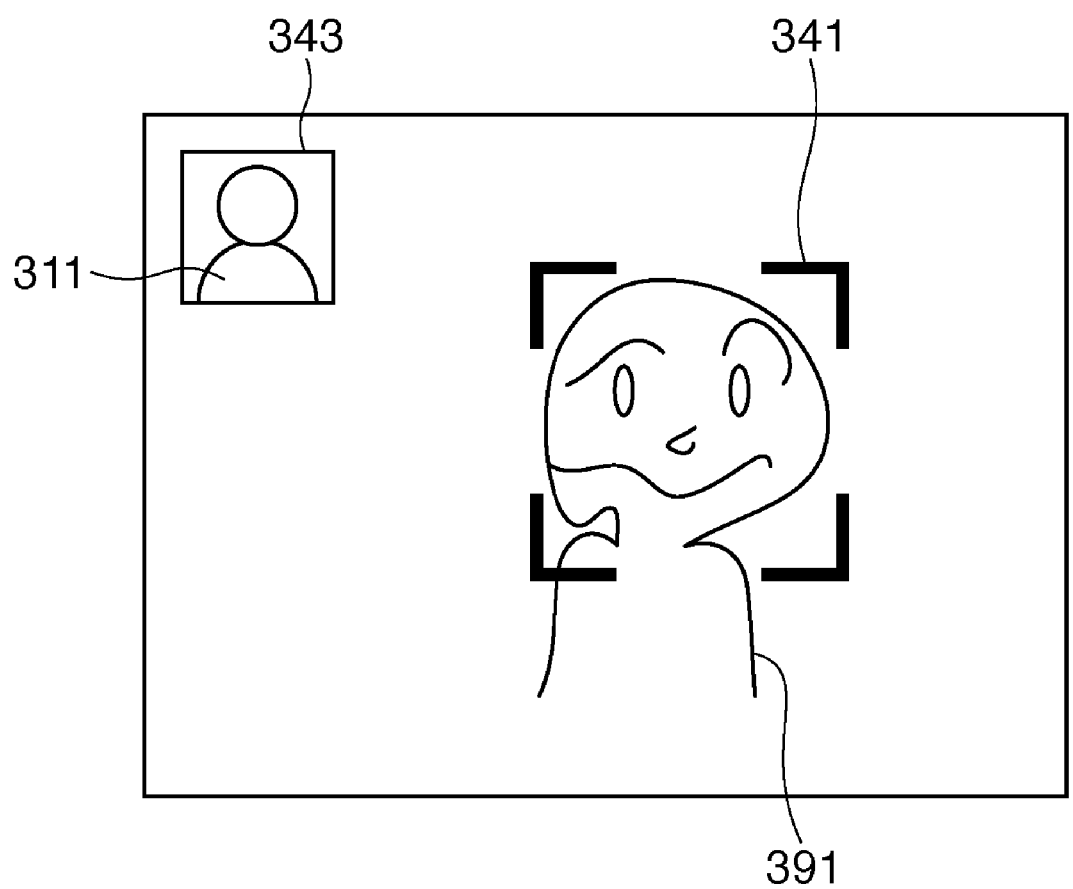
FIG. 3 is a view exemplifying a live image on a display unit.

A state in which the image sensing apparatus 100 identifies a scene and displays the identification result on the display unit 108 will be explained with reference to FIG. 3. FIG. 3 is a view exemplifying a live image on the display unit 108. FIG. 3 shows an image displayed on the display unit 108 when the image sensing apparatus 100 senses a person 391.

The subject image of the person 391 is formed on the image sensor 16 via the lens 10, photoelectrically converted, and then read out as image data from the image sensor 16. The image data read out from the image sensor 16 is stored in the temporary memory 30 or directly input to the image processing circuit 50. The image processing circuit 50 generates image data suited to face recognition and stores the generated image data in the temporary memory 30. The image processing circuit 50 generates image data suited to scene determination and stores the generated image data in the temporary memory 30. The image processing circuit 50 generates image data suited to display on the display unit 108 and stores the generated image data in the VRAM 34.

After that, the image data generated for face recognition is input to the image recognition circuit 38, and the image recognition circuit 38 performs face recognition to detect a human face. As a result of the face recognition, the image recognition circuit 38 acquires the number, position, and size of human faces. From the result of the face recognition by the image recognition circuit 38, when the display unit 108 displays the display image data generated in advance in the VRAM 34, the controller 60 superimposes a face detection frame 341 based on the result of the face recognition on the display image data, as shown in FIG. 3.

At the same time as the face recognition, the controller 60 reads out the generated image data suited to scene determination from the temporary memory 30, and performs scene determination (condition determination) to determine the condition of the subject. The scene determination complies with an algorithm implemented by executing preprogrammed codes by the CPU. Hence, the type of determinable scene and the performance of the scene determination depend on the program.

Information of a scene determined by the controller 60 is superimposed and displayed on the screen of the display unit 108 as an icon 343 representing the abstract of the state of the scene, together with the result of the face recognition by the image recognition circuit 38. More specifically, when the display unit 108 displays display image data generated in advance in the VRAM 34, the determined scene information is superimposed and displayed as the icon 343, as shown in FIG. 3. In the example of FIG. 3, a person's scene icon 311 is displayed at the upper left position of the display unit 108. However, the display form is not limited to this, and the display position, size, and icon design can be changed arbitrarily.

FIG. 4 exemplifies identifiable scenes and icons which abstract the respective scenes. A scene icon 301 represents a case in which the image recognition circuit 38 detects a human face and it is determined by scene determination processing that the current scene is a backlight scene. In the backlight scene, a bright subject such as the sun exists behind a main subject and the main subject becomes dark. The controller 60 divides an image for the scene determination into a plurality of blocks, checks the distribution of luminance information of each block, and determines whether it represents a backlight pattern.

Similarly, scene icons 303 and 305 represent backlight scenes in which the main subject is not a person. The scene icon 303 shows that the in-focus position is at close range. This in-focus position information may be abstracted as an icon.

The scene icon 311 and scene icons 313 and 315 represent not a backlight scene but a case in which the main subject is a person, a case in which the main subject is not a person and the in-focus position is at close range, and a case in which the main subject is not a person.

Scene icons 321 and 325 represent a case in which it is determined by scene determination processing that the current scene is a night scene. A night scene is determined by analyzing an image for the scene determination by the controller 60, similar to a backlight scene. More specifically, the controller 60 performs image analysis to determine whether a dark sky area exists by a predetermined size or more in the frame, or whether there is a point light source representing an illumination or the like.

A night scene may be determined using the camera shake amount of the image sensing apparatus 100 that is detected by the camera shake amount detection circuit 44 originally used for camera shake correction. In general, the shutter speed is low when sensing a night scene, so the user fixes the image sensing apparatus 100 by a tripod or places it at an arbitrary position to prevent a camera shake. Therefore, the controller 60 may shift to a night scene mode when the result of the detection by the camera shake amount detection circuit 44 reveals that the camera shake amount minimizes.

A scene icon 333 represents a case in which it is determined by scene determination processing that the current scene is an evening scene. The controller 60 determines the scene by the characteristic color of the evening. An image for the scene determination generated in the temporary memory 30 contains color information. The controller 60 analyzes the image to determine an evening scene, similar to a backlight scene. More specifically, when the controller 60 detects that a area with a predetermined color temperature exists by a predetermined size or more in a predetermined area of the image for the scene determination, it determines that the current scene is an evening scene.

In accordance with the result of the scene determination, the controller 60 controls the lens driving circuit 42, aperture driving circuit 26, mechanical shutter driving circuit 28, TG 24, PGA circuit 20, and image processing circuit 50. For example, even if the average values of pieces of luminance information obtained from the sensed image data are equal, the controller 60 changes the weight of luminance information in the sensed image data or changes a combination of the aperture and the exposure time depending on whether the main subject is a person and whether the scene is a backlight scene. Also, the controller 60 changes the amplification level of the PGA circuit 20 and changes the gamma conversion setting of the image processing circuit 50. Depending on whether the principal subject is a person, the controller 60 changes the depth of field of the lens 10 even if the value of the frequency component does not change. Further depending on whether the current scene is an evening scene or night scene, the controller 60 changes the setting of color processing for the sensed image data by the image processing circuit 50.

In a steady state before receiving the instruction of the shutter switch 104, the controller 60 generates an evaluation value (evaluation value of scene determination) periodically from sensed image in time series by the image sensor 16, in order to use the evaluation value for the above-described scene determination. When a predetermined number of evaluation values of scene determination are obtained, the controller 60 refers to the latest evaluation value of scene determination. If the scene has changed, the controller 60 updates the display of the scene icon. The controller 60 determines the generation of a scene change after obtaining a predetermined number of evaluation values of scene determination. This is because, if the result of the scene determination is updated too frequently, the result of the scene determination changes quickly depending on the condition of the subject. The quick change of the result of the scene determination may annoy the user or make the control of the image sensing apparatus unstable.

In many situations, however, the image sensing apparatus 100 senses an image immediately after the scene changes suddenly, for example, when the subject is changed suddenly or moves abruptly. Before sensing an image, image sensing preparation is necessary by the SW1 operation of the shutter switch 104. When sensing an image immediately after, for example, the subject moves and the scene changes suddenly, it is desirable to shorten the time taken for image sensing preparation based on the SW1 operation. On the other hand, the image sensing apparatus 100 is required to properly detect a scene change and perform appropriate exposure adjustment, focus adjustment, and scene icon display for a subject after the scene change.

Figure 5:
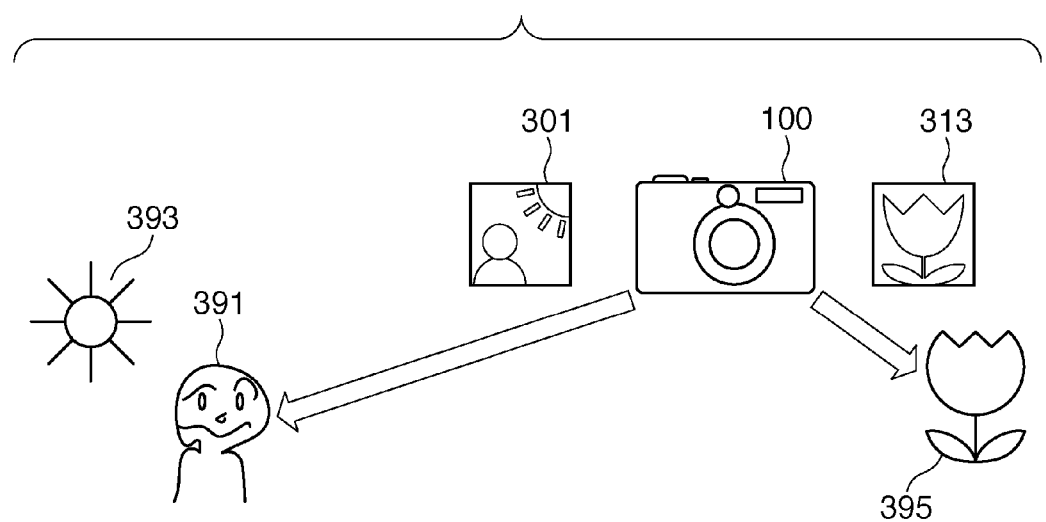
FIG. 5 is a view exemplifying scene determination corresponding to a subject in image sensing.

FIG. 5 exemplifies image sensing by the image sensing apparatus 100. In the example of FIG. 5, the user tries to sense a flower 395 but stands at a position apart from the flower 395, and various subjects fall within the angle of view of the image sensing apparatus 100. For example, when a person 391 sitting near the flower 395 while backing against sun 393 falls within the angle of view, the scene icon display is the scene icon 301 representing a backlight scene containing a person.

As the user with the image sensing apparatus 100 comes close to the flower 395 from this state, the person 391 falls outside the angle of view and the flower 395 to be sensed is positioned large at the center of the angle of view. Immediately after the person 391 falls outside the angle of view, image sensing preparation is done by the SW1 operation. At this time, the flower 395 to be sensed exists at the center of the frame. It is desirable to display the scene icon 313 representing a state in which the subject is focused at close range regardless of the scene determination period. In short, it is desirable to shorten the processing time taken for the scene determination and accurately determine a new scene in image sensing preparation by the SW1 operation.

Figure 6:
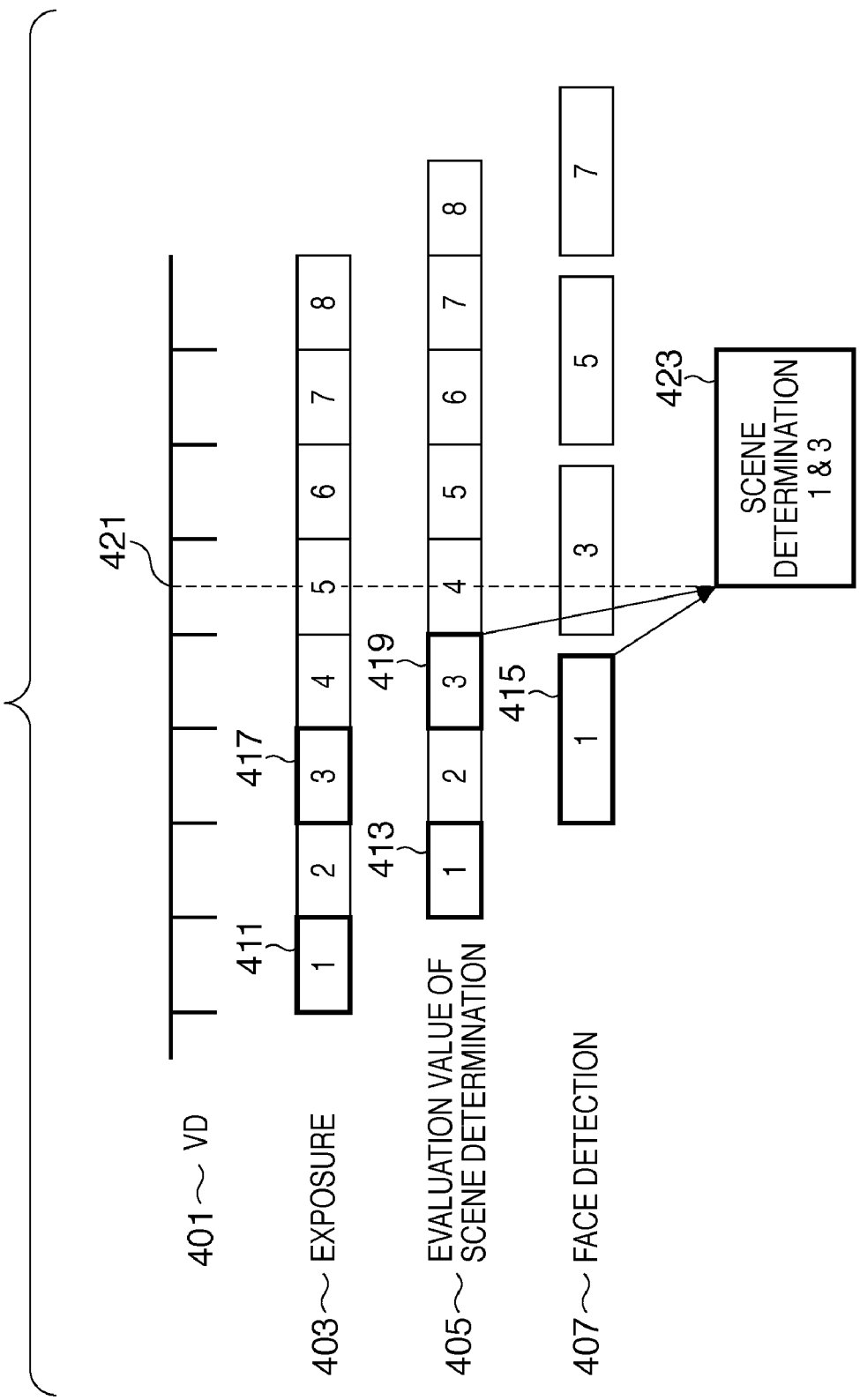
FIG. 6 is a timing chart showing an example of the timings of generation of the evaluation value of scene determination, face detection, and scene determination.

The timings of generation of the evaluation value of scene determination, face detection, and scene determination will be explained with reference to the timing chart of FIG. 6. As shown in FIG. 6, the controller 60 exposes the image sensor 16 in synchronism with each vertical driving pulse (VD) based on a vertical sync signal 401 generated by the TG 24. The controller 60 reads out image data obtained by exposing the image sensor 16 in synchronism with each VD, and generates an evaluation value of scene determination based on the readout image data. That is, the image sensing apparatus 100 sequentially calculates a evaluation value of scene determination concerning determination of the condition of the subject from each sensed images in time series. The controller 60 causes the image recognition circuit 38 to perform face detection based on image data read out from the image sensor 16. That is, the image sensing apparatus 100 sequentially detects human faces from images sensed in time series.

In the image sensing apparatus 100, the exposure 403 is executed in synchronism with every VD. The generation of the evaluation value of scene determination 405 is done in synchronism with every VD after the first VD of the exposure 403. The face detection 407 is performed in a 2-VD cycle next to the first VD of the generation of the evaluation value of scene determination 405. More specifically, the generation of the evaluation value of scene determination 405 based on image data obtained in an exposure period 411 is executed in a next VD period 413. The face detection 407 based on the image data obtained in the exposure period 411 is executed in synchronism with a VD next to the VD period 413, that is, in a period 415 which starts at the same timing as an exposure period 417.

The timing when the face detection 407 is done depends on the processing speed of the image recognition circuit 38. In the example of FIG. 6, processing does not end within the 1-VD period when the image recognition circuit 38 executes face detection using one input image. However, FIG. 6 shows merely an example, and the processing time of the face detection changes depending on the performance, detection precision, input image size, and the like of the image recognition circuit 38. For example, the processing time of the face detection is sometimes shorter or longer than one VD period.

When scene determination is executed at a time 421 among timings exemplified in FIG. 6 by using the latest evaluation value of scene determination and the latest result of the face detection at that time, the controller 60 determines one scene using image data obtained in different exposure periods. More specifically, the latest evaluation value of scene determination at the time 421 is output in a period 419 based on image data in the exposure period 417. The latest result of the face detection is output in the period 415 based on image data in the exposure period 411. The exposure periods 411 and 417 have a time lag of two VDs. It is therefore difficult for the controller 60 to accurately determine a scene using the latest evaluation value of scene determination and the latest result of the face detection at the time 421.

Figure 7:
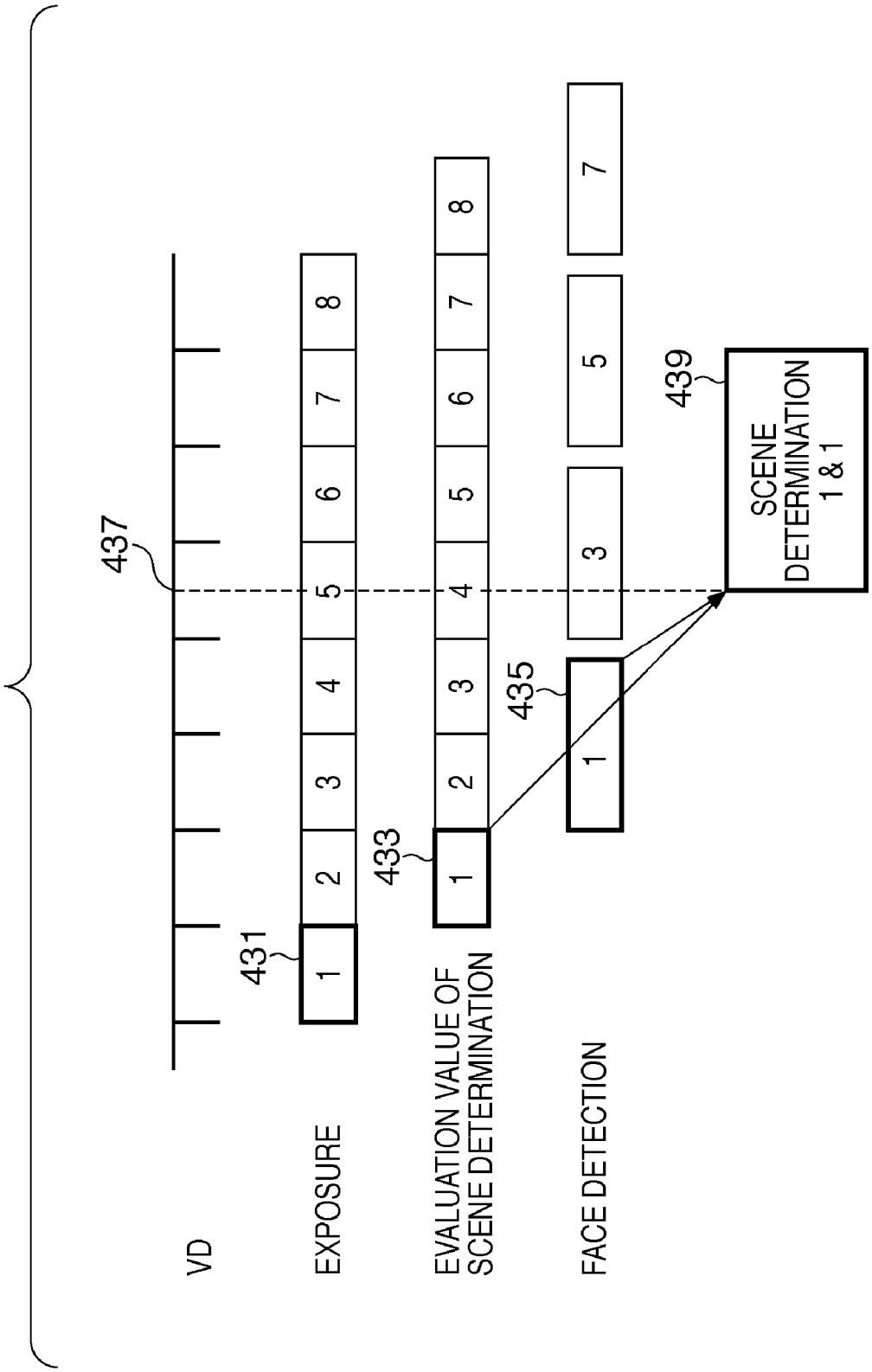
FIG. 7 is a timing chart showing another example of the timings of generation of the evaluation value of scene determination, face detection, and scene determination.

FIG. 7 is a timing chart when canceling the time lag between exposure times used for the evaluation value of scene determination and the face detection. As shown in FIG. 7, scene determination at a time 437 uses not the latest evaluation value of scene determination and the latest result of the face detection, but an evaluation value of scene determination and a result of the face detection which are based on image data in the same exposure period.

More specifically, when the latest result of the face detection at the time 437 is output in a period 435 based on an exposure period 431, the controller 60 performs scene determination in a period 439 using an evaluation value of scene determination output in a period 433 based on the same exposure period 431. By using an evaluation value of scene determination and a result of the face detection that are generated from image data in the same exposure period, the controller 60 can make more accurate scene determination. Since evaluation values of scene determinations for several past VDs are used at the time 437, the temporary memory 30 ensures an area enough to store evaluation values of scene determinations for several VDs.

In the example of FIG. 7, the result of the face detection is output after the evaluation value of scene determination is output. Alternatively, the evaluation value of scene determination may be output after the result of the face detection is output. Also in this case, scene determination is done using an evaluation value of scene determination and a result of the face detection that are generated from image data in the same exposure period. Since the results of the face detection for several past VDs are used, the temporary memory 30 ensures an area enough to store the results of the face detection for several VDs.

Figure 8:
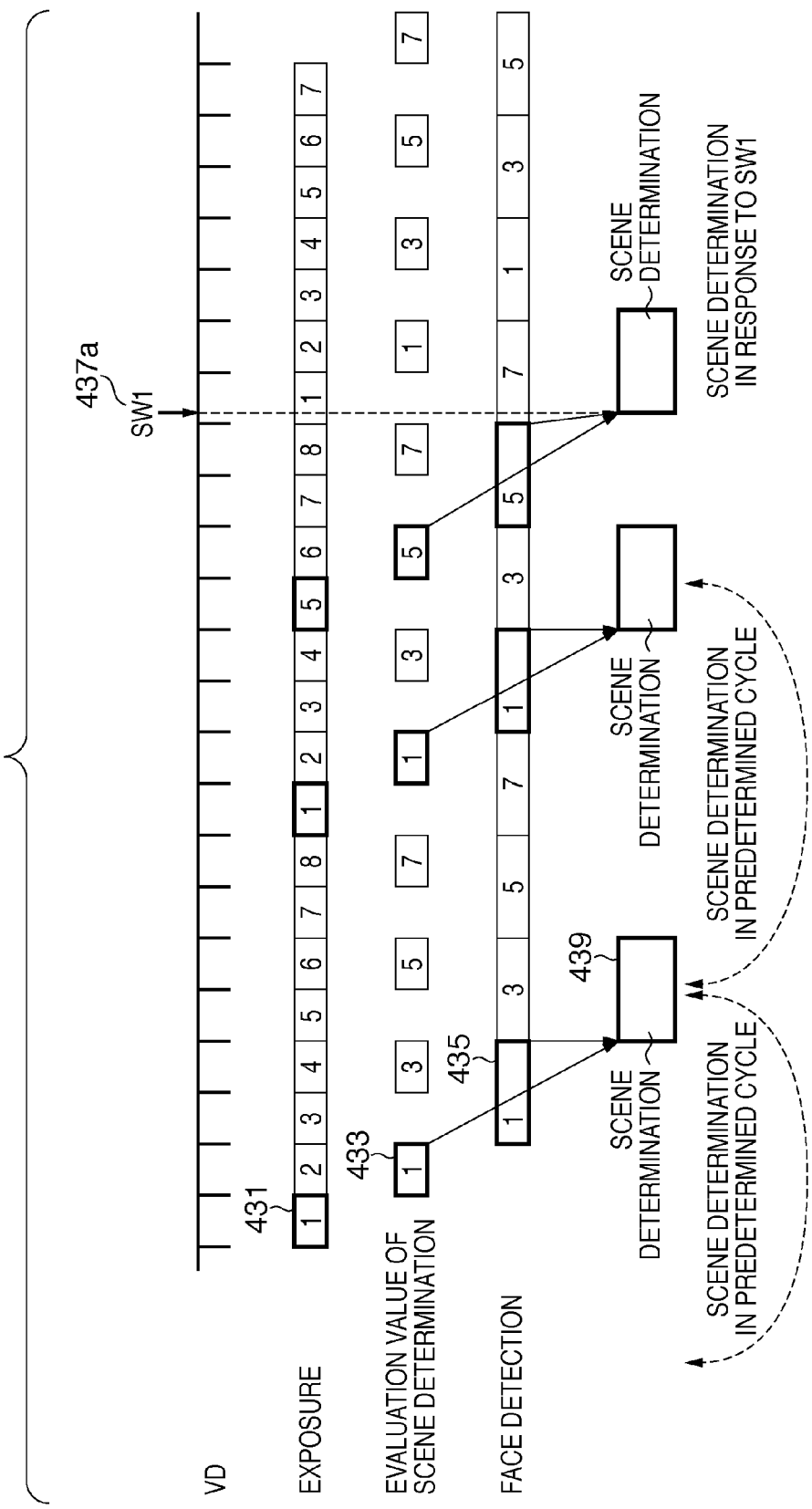
FIG. 8 is a timing chart showing an example of the timings of generation of the evaluation value of scene determination, face detection, and scene determination upon pressing SW1.

FIG. 8 is a timing chart of a steady state before the SW1 operation and the SW1 operation. In the example shown in FIG. 8 as well as FIG. 7, the controller 60 performs scene determination using an evaluation value of scene determination and a result of the face detection that are generated from image data in the same exposure period. Before the SW1 operation at a time 437a, the controller 60 keeps performing determination sequentially in a predetermined cycle. In the SW1 operation, the controller 60 performs scene determination using the latest result of the face detection and an evaluation value of scene determination generated from image data in the same exposure period as that of the result of the face detection.

The example of FIG. 8 is premised on that the subject does not vary between the steady state before the SW1 operation at the time 437a and the SW1 operation. When the SW1 operation is executed before the completion of tracking a subject, for example, when the scene changes just before the SW1 operation and an image is to be sensed, scene determination corresponding to a new scene is properly performed. For this purpose, the controller 60 needs to perform scene determination after the end of tracking a subject.

Figure 9:
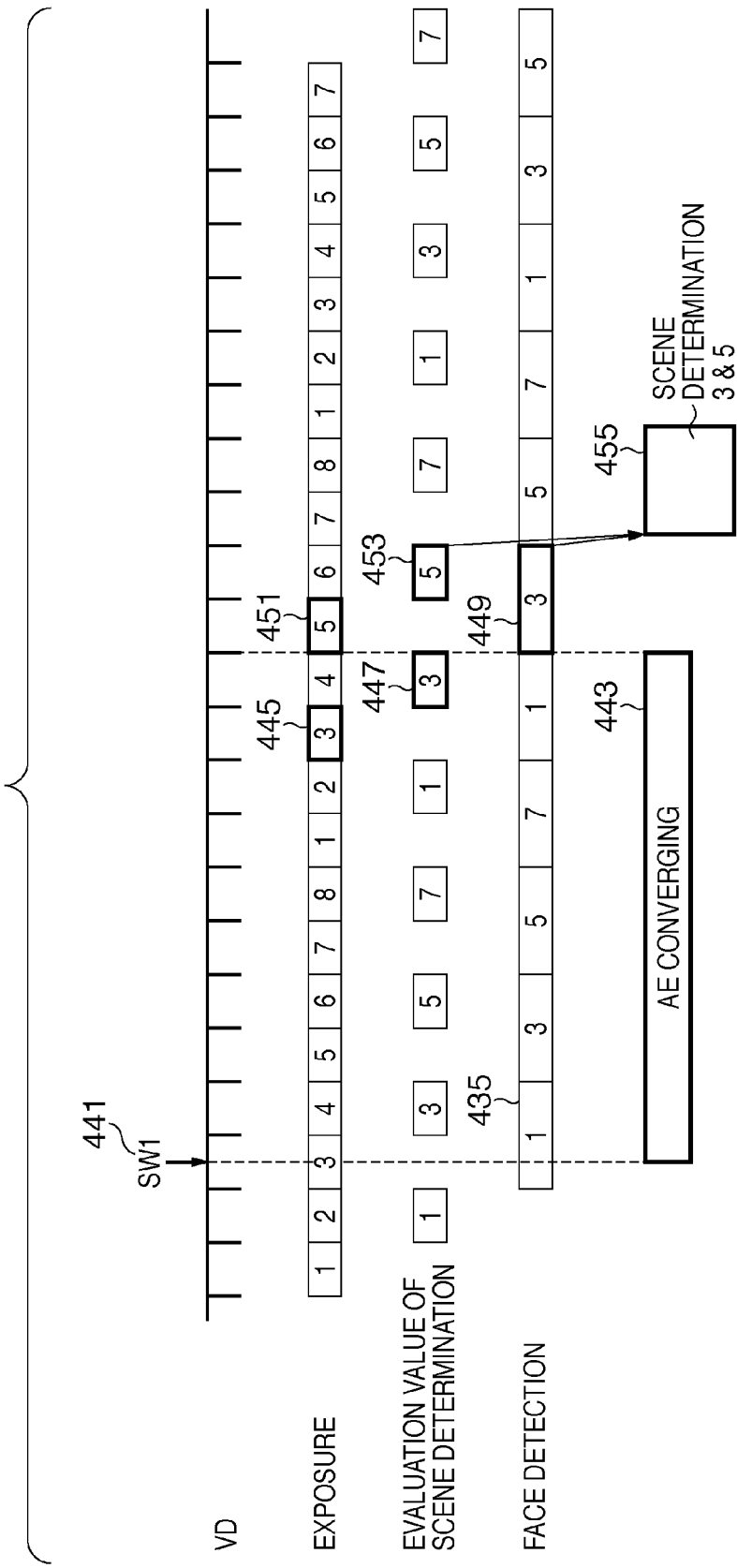
FIG. 9 is a timing chart showing an example of the timings of generation of the evaluation value of scene determination, face detection, and scene determination when performing luminance tracking.

FIG. 9 is a timing chart when luminance tracking to a subject is not completed in the SW1 operation. As shown in FIG. 9, to sense an image with an exposure optimum for a subject in the SW1 operation at a time 441, the controller 60 controls the image processing circuit 50 to measure (photometry) the luminance of a subject using the sensed image data acquired by the image sensor 16.

Photometry with the image sensor 16 such as CCD or CMOS image sensor, the problem is a narrow dynamic range of the image sensor 16. The dynamic range of the image sensor 16 is originally not wide and is not suitable for photometry of a scene which greatly changes the brightness difference. If the exposure is improper, highlight detail loss at a bright area and shadow detail loss at a dark area stand out in the sensed image data acquired by the image sensor 16, failing in accurate photometry. When performing photometry with the image sensor 16 having a narrow dynamic range, the exposure including the aperture, electronic shutter, and gain needs to be adjusted stepwise to appropriately control the quantity of light incident on the image sensor 16.

In photometry in the SW1 operation at the time 441, the quantity of light on the image sensor 16 is improper, so an AE converging period 443 for properly adjusting the light quantity is set, as shown in FIG. 9. During the AE converging period, scene determination waits until a luminance obtained from the sensed image data converges to a predetermined range (e.g., ±⅓ steps) with respect to a target luminance. In a period 455 after the luminance obtained from the sensed image data converges to the predetermined range with respect to the target luminance, the controller 60 makes scene determination. This is because, if scene determination is done using an evaluation value of scene determination obtained before the lapse of the AE converging period, shadow detail loss and highlight detail loss are highly likely to occur in a area different from that after the lapse of the AE converging period. In this situation, none of the luminance distribution of the sensed image data, the frequency component, color information, and the like can be detected appropriately. The controller 60 may derive an erroneous result of the scene determination.

To prevent this, the new data (data obtained immediately after a luminance obtained from the sensed image data converges to the predetermined range of a target luminance) are adopted as the evaluation value of scene determination and the result of the face detection used to perform scene determination. More specifically, an evaluation value of scene determination used for scene determination in a period 455 is one generated in a period 453 based on image data in an exposure period 451 after AE converging. A result of the face detection used for scene determination in the period 455 is one generated in a period 449 based on image data in an exposure period 445 before AE converging.

If scene determination requires AE converging, the time lag of the AE converging period is generated. When performing face detection based on image data in an exposure period after AE converging, a new time lag is further added to the time lag of the AE converging period. In the example of FIG. 9, when AE converging is necessary, the sequence places importance on shortening the time lag in scene determination by using an evaluation value of scene determination and a result of the face detection that are generated based on image data in different exposure periods. In other words, the controller 60 makes scene determination based on an evaluation value of scene determination and a result of the face detection which are obtained immediately after AE converging. In this case, the result of the face detection is generated based on image data before AE converges. However, it is considered that image data just before convergence does not greatly differ from one obtained after AE converging. The controller 60 therefore determines that a certain level of reliability can be ensured for a result of the face detection generated based on image data just before convergence. Immediately after obtaining an evaluation value of scene determination from image data in an exposure period after AE converging, the controller 60 performs scene determination using the result of the face detection and the evaluation value of scene determination.

Figure 10:
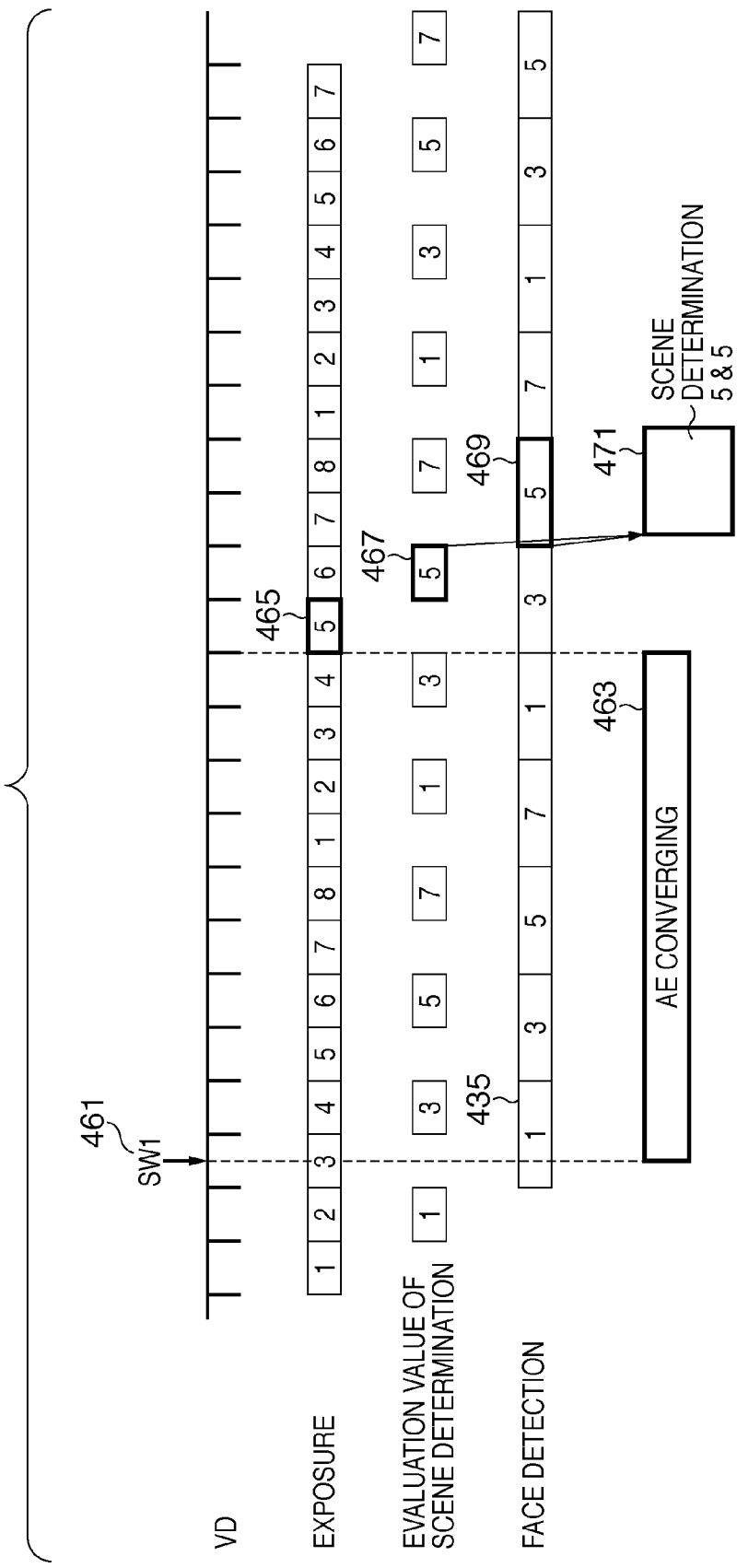
FIG. 10 is a timing chart showing another example of the timings of generation of the evaluation value of scene determination, face detection, and scene determination when performing luminance tracking.

However, this sequence may be changed in accordance with the SW1 and SW2 operations of the user. FIG. 10 shows a sequence of performing scene determination using an evaluation value of scene determination and a result of the face detection that are generated from image data in the same exposure period even when luminance tracking to a subject is not completed in the SW1 operation and AE converging is necessary.

The controller 60 executes exposure adjustment and focus adjustment as image sensing preparations in the SW1 operation, and then senses an image in the SW2 operation. As the two-step user operation, there are a sensing procedure of temporarily suspending the SW1 operation, performing exposure adjustment, focus adjustment, and confirming the composition, and then performing the SW2 operation, and a sensing procedure of performing the SW2 operation immediately after the SW1 operation without any interval. When the SW1 operation is temporarily suspended, like the former procedure, there is an interval till sensing by the SW2 operation. It is considered that the request to shorten the time lag in scene determination is not so strict.

When temporarily suspending the SW1 operation, scene determination is done using an evaluation value of scene determination and a result of the face detection based on image data in the same exposure period after the lapse of an AE converging period 463 in the SW1 operation at a time 461, as shown in FIG. 10. More specifically, an evaluation value of scene determination and a result of the face detection based on image data in an exposure period 465 after AE converging are acquired in periods 467 and 469. In a period 471, the controller 60 makes scene determination based on the acquired evaluation value of scene determination and the acquired result of the face detection.

As is apparent from a comparison between FIGS. 9 and 10, a time lag of about two VDs occurs in scene determination using an evaluation value of scene determination and a result of the face detection based on image data in the same exposure period after AE converging. However, in a situation in which shortening a time lag in scene determination is not so important, priority can be given to the advantage of increasing the scene determination precision. This is because scene determination is performed using an evaluation value of scene determination and a result of the face detection based on image data in the same exposure period.

Figure 11:
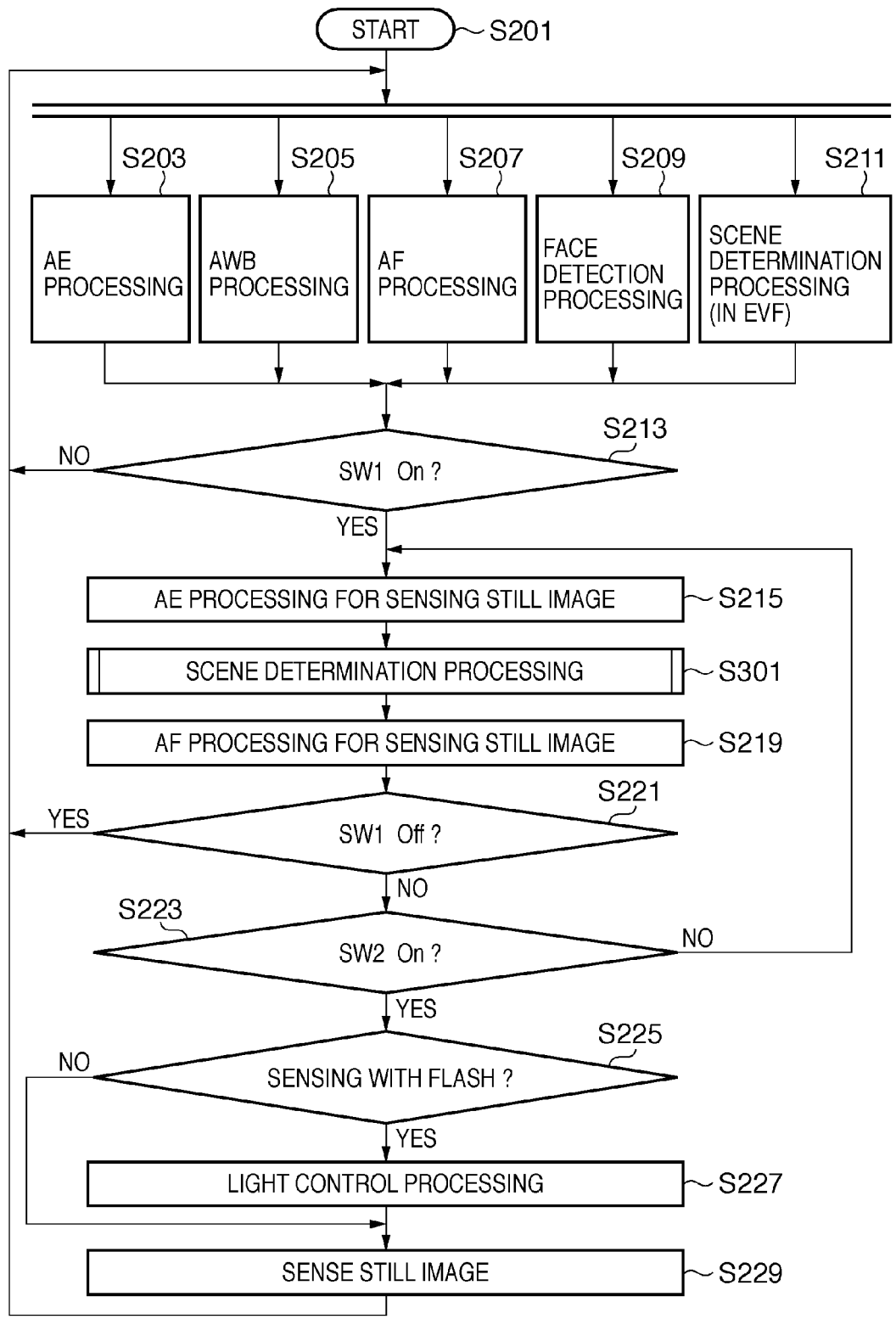
FIG. 11 is a flowchart showing the overall sequence of the image sensing apparatus.

How to selectively use the above-described sequences in the image sensing apparatus 100 in accordance with AE converging and the user operation will be explained with reference to FIG. 11. FIG. 11 shows the overall sequence of the image sensing apparatus 100 from activation to sensing.

As shown in FIG. 11, when the process starts in response to the instruction of the power switch 102 or the like (S201), the image sensing apparatus 100 shifts to an EVF state to display a live image on the display unit 108 under the control of the controller 60. In the EVF state, the controller 60 properly adjusts the quality of a display image on the display unit 108 and controls the display unit 108 to display the results of performing face detection and scene determination. In the EVF state, AE processing (S203), AWB processing (S205), AF processing (S207), face detection processing (S209), and scene determination processing (S211) are executed under the control of the controller 60.

In the scene determination processing (S211), scene determination is done using the sequence exemplified in FIG. 8 under the control of the controller 60. That is, in the EVF state, the controller 60 keeps executing scene determination by using an evaluation value of scene determination and a result of the face detection based on image data in the same exposure period.

The controller 60 then determines whether the SW1 operation by the shutter switch 104 is instructed or not (ON/OFF) (S213), and continues the processes in S203 to S211 until the SW1 operation is confirmed. If the SW1 operation is confirmed, the controller 60 executes AE processing for sensing a still image (S215). In the AE processing, the luminance of subject is measured based on an image sensed by the image sensor 16. Even if the subject luminance is not at an appropriate level or is not stable, the controller 60 shifts the process to S301.

The controller 60 performs scene determination processing for sensing a still image (S301). The scene determination processing in S301 will be explained with reference to FIG. 12. As shown in FIG. 12, after the start of the scene determination processing, the controller 60 determines whether AE is stable (AE has converged) (S303).

If AE is stable (has converged), the controller 60 needs not converge AE (AE has already converged). The controller 60 therefore performs scene determination processing in which the exposure periods of image data used for the evaluation value of scene determination and face detection are synchronized. That is, the controller 60 executes scene determination using an evaluation value of scene determination and a result of the face detection based on image data in the same exposure period (S309). In other words, in S309, the controller 60 executes scene determination processing based on a result of the face detection and an evaluation value of scene determination for an image sensed at the same timing among images sensed in time series.

If AE is not stable (has not converged), the AE converging period continues. The controller 60 waits until AE converges (S305). After AE converges, the controller 60 determines whether the user has pressed SW1 and SW2 at once (S307). In S307, the controller 60 determines whether the user has performed the SW2 operation within a predetermined time after the SW1 operation. The controller 60 determines whether the user has executed the sensing procedure of performing the SW2 operation just after the SW1 operation without any interval.

If the user has not pressed SW1 and SW2 at once (the SW1 operation is temporarily suspended and the interval between the SW1 and SW2 operations is equal to or longer than a predetermined time), it is possible to give importance to increasing the scene determination precision rather than shortening the time lag in scene determination. Thus, as exemplified in FIG. 10, the controller 60 performs scene determination processing in which the exposure periods of image data used for the evaluation value of scene determination and face detection are synchronized (S309).

If the user has pressed SW1 and SW2 at once (he has executed the SW2 operation just after the SW1 operation without any interval), it is more important to shorten the time lag than to increase the scene determination precision, in order to perform image sensing corresponding to the SW2 operation. As exemplified in FIG. 9, the controller 60 executes scene determination processing in which the exposure periods of image data used for calculating the evaluation value of scene determination and the face detection processing are not the same but asynchronous (S311), thereby shortening the time lag in scene determination. In other words, in S311, the controller 60 executes scene determination processing based on an evaluation value of scene determination and a result of the face detection that are obtained immediately after the SW2 operation.

As shown in FIG. 11, after the scene determination processing, the controller 60 performs AF processing for sensing a still image (S219), adjusting the focus on the subject. At the end of performing S219, the processing in the SW1 operation is completed.

Thereafter, the controller 60 determines whether SW1 has been turned off (S221). If SW1 has been turned off, the controller 60 determines that the user has canceled the image sensing preparation, and returns the process to the loop in the EVF steady state.

If SW1 remains ON and the user keeps pressing SW1, the controller 60 determines whether he has turned on SW2 (S223). In response to the ON operation of SW2, the controller 60 starts an image sensing operation, that is, still image sensing processing (S225 to S229). If SW2 remains OFF, the controller 60 returns the process to S215.

After the start of the still image sensing processing, the controller 60 determines, based on information set in advance for whether to emit flashlight and the subject luminance, whether to perform flash sensing by emitting light from the flash (S225). If flash emission is to be performed, the controller 60 executes light control processing to determine the flashlight quantity in sensing a still image (S227). In the light control processing, the flash emits a predetermined quantity of light in advance, and a photometer or the image processing circuit 50 measures the reflected light. Based on the measurement result, the controller 60 confirms the reflectance of the subject and the quantity of arriving flashlight, and determines the quantity of flashlight.

By these processes, sensing conditions including the exposure, scene, focus, and flash are determined for still image sensing. The controller 60 executes sensing a still image suited to the subject (S229). That is, in S229, still image sensing is done based on the result of determining the condition of the subject by the scene determination processing. After the still image sensing, the controller 60 returns the process to the loop in the EVF steady state.

The embodiment has exemplified a case in which it takes a longer time to acquire a result of the face detection than to calculate an evaluation value of scene determination. In contrast, the calculation of the evaluation value of scene determination may take a longer time than the acquisition of the result of the face detection. In short, scene determination suffices to use a result of the face detection and an evaluation value of scene determination that are obtained immediately upon receiving an image sensing instruction, in order to reduce a time lag when specifying a scene upon receiving a still image sensing instruction.

The description of the embodiment is merely an example, and the present invention is not limited to this. The arrangement and operation of the above-described embodiment can be arbitrarily changed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-022962, filed Feb. 3, 2009, which is hereby incorporated by reference herein in its entirety.

What is claimed is:

1. An image sensing apparatus comprising:
    an image sensing unit adapted to sense images of a subject in time series;
    a calculation unit adapted to calculate an evaluation value of scene determination used for determination of a condition of said subject, for one of said images sensed by said image sensing unit;
    a scene determination unit adapted to determine said condition of said subject based on said evaluation value of scene determination calculated by said calculation unit;
    an operation receiving unit adapted to receive an instruction from a user to start a preparation of sensing a still image and an instruction from the user to start sensing a still image; and
    a control unit adapted to control said scene determination unit and, if said operation receiving unit receives said instruction to start sensing a still image, further control said image sensing unit to perform sensing one still image based on said condition of said subject determined by said scene determination unit,
    wherein if said operation receiving unit receives said instruction to start the preparation of sensing a still image, said control unit further controls said scene determination unit to determine said condition of said subject based on said evaluation value of scene determination calculated from an image sensed by said image sensing unit immediately after the luminance of said images converges to a predetermined range of a target luminance.

2. The image sensing apparatus according to claim 1, further comprising a face detection unit adapted to detect a human face from one of said images sensed by said image sensing unit,
    wherein said control unit controls said scene determination unit to determine said condition of said subject based on a result of the face detection by said face detection unit and said evaluation value of scene determination calculated by said calculation unit.

3. The image sensing apparatus according to claim 2, wherein if said operation receiving unit receives said instruction to start the preparation of sensing a still image, said control unit controls said scene determination unit to determine said condition of said subject based on said evaluation value of scene determination calculated from, an image sensed immediately after the luminance of said images converges to a predetermined range of a target luminance, and a result of the face detection detected from an image sensed before the image used to calculate said evaluation value of scene determination.

4. The image sensing apparatus according to claim 3, wherein before receiving said instruction to start the preparation of sensing a still image, said control unit controls said scene determination unit to determine said condition of said subject based on a result of the face detection and said evaluation value of scene determination that are obtained from an image sensed at the same timing.

5. A method for controlling an image sensing apparatus including an image sensing unit adapted to sense images of a subject in time series, a calculation unit adapted to calculate an evaluation value of scene determination used for a determination of a condition of said subject, for one of said images sensed by the image sensing unit, a scene determination unit adapted to determine said condition of said subject based on said evaluation value of scene determination calculated by the calculation unit, and an operation receiving unit adapted to receive an instruction from a user to start a preparation of sensing a still image and an instruction from the user to start sensing a still image, the method comprising the steps of:

controlling said scene determination unit and, if said operation receiving unit receives said instruction to start sensing a still image, further controlling said image sensing unit to perform sensing one still image based on said condition of said subject determined by said scene determination unit, wherein in the controlling step, if said operation receiving unit receives said instruction to start the preparation of sensing a still image, said scene determination unit is controlled to determine said condition of said subject based on said evaluation value of scene determination calculated from an image sensed by said image sensing unit immediately after the luminance of said images converges to a predetermined range of a target luminance.

6. A non-transitory computer-readable storage medium wherein a program is stored which is used to make a computer execute the steps constituting the method for controlling the image sensing apparatus according to claim 5.

* * * * *